(12) United States Patent
Hufen et al.

(10) Patent No.: US 9,290,654 B2
(45) Date of Patent: Mar. 22, 2016

(54) POLYMER COMPOSITIONS WITH IMPROVED ADHESION

(71) Applicant: BAYER INTELLECTUAL PROPERTY GMBH, Monheim (DE)

(72) Inventors: Ralf Hufen, Duisburg (DE); Andreas Seidel, Dormagen (DE)

(73) Assignee: BAYER INTELLECTUAL PROPERTY GMBH, Monheim (DE)

( * ) Notice: Subject to any disclaimer, the term of this patent is extended or adjusted under 35 U.S.C. 154(b) by 196 days.

(21) Appl. No.: 13/730,646

(22) Filed: Dec. 28, 2012

(65) Prior Publication Data

US 2013/0196130 A1 Aug. 1, 2013

(30) Foreign Application Priority Data

Dec. 29, 2011 (EP) .................................... 11196095

(51) Int. Cl.

| | |
|---|---|
| *B32B 7/02* | (2006.01) |
| *B32B 17/10* | (2006.01) |
| *C08F 290/04* | (2006.01) |
| *C08K 3/34* | (2006.01) |
| *C08J 3/24* | (2006.01) |
| *C08L 69/00* | (2006.01) |
| *B32B 5/18* | (2006.01) |
| *C08K 13/02* | (2006.01) |

(52) U.S. Cl.
CPC . *C08L 69/00* (2013.01); *B32B 5/18* (2013.01); *C08K 13/02* (2013.01); *Y10T 428/24967* (2015.01); *Y10T 428/249953* (2015.04); *Y10T 428/269* (2015.01)

(58) Field of Classification Search
None
See application file for complete search history.

(56) References Cited

U.S. PATENT DOCUMENTS

| | | | |
|---|---|---|---|
| 7,030,180 B2 | 4/2006 | Seidel et al. | |
| 2002/0068808 A1* | 6/2002 | Kometani et al. | 528/54 |
| 2002/0132899 A1 | 9/2002 | Seidel et al. | |
| 2003/0220407 A1* | 11/2003 | Chaignon et al. | 521/50 |
| 2009/0215945 A1 | 8/2009 | Moulinie et al. | |
| 2010/0152358 A1 | 6/2010 | Jung et al. | |
| 2011/0027575 A1 | 2/2011 | Drube et al. | |
| 2011/0135934 A1* | 6/2011 | Seidel et al. | 428/412 |

FOREIGN PATENT DOCUMENTS

| | | |
|---|---|---|
| EP | 0249964 A2 | 12/1987 |
| WO | 02059203 A1 | 8/2002 |
| WO | 2009/080244 A1 | 7/2009 |
| WO | 2011/015286 A1 | 2/2011 |

OTHER PUBLICATIONS

International Search Report and Written Opinion of International Application No. PCT/EP2012/076308, dated Mar. 8, 2013 (in German language).

* cited by examiner

*Primary Examiner* — David Sample
*Assistant Examiner* — Nicole T Gugliotta
(74) *Attorney, Agent, or Firm* — MMWV, IP PLLC

(57) ABSTRACT

Polymer compositions with improved lacquer adhesion comprising
A) 30 to 80 parts by wt. of at least one polymer chosen from the group of aromatic polycarbonates and aromatic polyester carbonates,
B) 2 to 40 parts by wt. of at least one rubber-free and/or rubber-modified vinyl (co)polymer, the rubber-modified vinyl (co)polymers being prepared in the bulk, solution or suspension polymerization process,
C) 0.5 to 20.0 parts by wt. of at least one rubber-modified vinyl (co)polymer prepared in the emulsion polymerization process,
D) 2 to 16 parts by wt. of at least one polymer,
E) 0 to 35 parts by wt. of at least one inorganic filler or reinforcing substance,
F) 0.01 to 20.0 parts by wt. of at least one polymer additive, wherein the sum of the parts by weight of components A+B+C+D+E+F in the composition is 100.

21 Claims, No Drawings

POLYMER COMPOSITIONS WITH IMPROVED ADHESION

CROSS REFERENCE TO RELATED APPLICATIONS

This application claims priority to European Patent Application No. 11196095.1, filed Dec. 29, 2011, the content of which is incorporated herein by reference in its entirety.

BACKGROUND

1. Field of the Invention

The present invention relates to polycarbonate compositions (PC compositions) which, in composite components, have an improved adhesive bond in direct contact (without primer) with polyurethane-based components, such as, for example, lacquers, hard or soft solid coatings or foams, and the composite components and a process for their production. In this context, the polyurethane layer can serve, for example, to improve the surface properties, the haptic properties, the visual properties and the noise and heat insulation of the composite components.

2. Description of Related Art

In particular in a composite with polyurethane-based lacquers, preferably water-based lacquer systems, the compositions according to the invention have an improved lacquer adhesion. Preferred compositions according to the invention furthermore have a combination of high E modulus, high heat distortion temperature, low and largely isotropic coefficients of thermal expansion, low shrinkage during processing and high melt flowability and are particularly preferably suitable in this respect for production of large-area lacquered automobile body components.

The application of polyurethane-based layers to supports of polycarbonate compositions is known in principle from the prior art, and in the case of impact-modified polycarbonate compositions reinforced with minerals, which are employed for the production of large-area automobile body components with high demands on toughness, rigidity and dimensional accuracy, in general require, however, the additional application of a primer, i.e. an adhesion-promoting primer layer, to achieve an adequate adhesive bond.

In the course of an inexpensive and also ecologically favourable production of components, it is desirable, especially on the part of the automobile industry, to provide polycarbonate compositions which, in composite components, have an improved and therefore adequate adhesive bond in direct contact with polyurethane-based layers, i.e. also without an adhesion-promoting primer intermediate layer.

EP 1355988 A1 describes polycarbonate compositions containing aromatic polycarbonate, inorganic material of anisotropic particle geometry, preferably talc, rubber-modified vinyl (co)polymer and one or more components chosen from the group of thermoplastic rubber-free vinyl (co)polymers and polyalkylene terephthalates. However, the application makes no references at all to the advantages of such compositions with a particular ratio of polycarbonate, polyalkylene terephthalate and vinyl (co)polymer with respect to lacquer adhesion.

SUMMARY

An object of the present invention was thus to provide thermoplastic PC compositions, in particular impact-modified PC compositions which have a mineral filler content, good toughness, melt flowability, high heat distortion temperature, high rigidity and low, largely isotropic coefficients of thermal expansion, and which, in a coating with a polyurethane-based system, preferably lacquer, following a shaping thermal process step, lead to good adhesion properties of the coating on the support of plastic without application of an adhesion-promoting intermediate layer (primer).

A further object moreover was to develop a coating process dispensing with application of an adhesion-promoting layer (primer), which is suitable for the production of polyurethane-coated shaped parts of impact-modified PC compositions having a mineral filler content, preferably for use in vehicle construction, in particular for vehicle body uses with high demands on component precision (minimization of gap dimensions), the coated shaped parts being distinguished by an improved adhesion between the support of plastic and the polyurethane layer.

It was furthermore an object of the present invention to provide shaped parts which are coated with polyurethane-based systems and have an improved adhesion between the layers.

It has been found, surprisingly, that the present object is achieved by impact-modified compositions containing:

30 to 80 parts by wt., preferably 40 to 75 parts by wt., in particular 45 to 62 parts by wt. of aromatic polycarbonate and/or polyester carbonate, 2 to 40 parts by wt., preferably 8 to 25 parts by wt., in particular 14 to 20 parts by wt. of at least one rubber-free and/or rubber-modified vinyl (co)polymer, the rubber-modified vinyl (co)polymers being prepared in the bulk, solution or suspension polymerization process, 0.5 to 20.0 parts by wt., preferably 2 to 15 parts by wt., in particular 4 to 10 parts by wt. of at least one rubber-modified vinyl (co)polymer prepared in the emulsion polymerization process, preferably with silicone/acrylate composite rubber as the graft base, 2 to 16 parts by wt., preferably 3 to 12 parts by wt., in particular 4 to 10 parts by wt. of at least one polyester, preferably an aromatic polyester, further preferably a polyalkylene terephthalate, particularly preferably polybutylene terephthalate, 0 to 35 parts by wt., preferably 5 to 30 parts by wt., in particular 15 to 25 parts by wt. of at least one inorganic filler or reinforcing substance, preferably talc, 0.01 to 20 parts by wt., preferably 0.1 to 10 parts by wt., in particular 0.3 to 5 parts by wt. of at least one polymer additive, wherein the sum of the contents of components A to F adds up to 100 parts by weight.

DETAILED DESCRIPTION OF A PREFERRED EMBODIMENT

In a preferred embodiment, the composition consists of or consists essentially of components A-D and F.

In a further preferred embodiment, the composition consists of or consists essentially of components A-F.

In a further preferred embodiment, a mixture of a rubber-free vinyl (co)polymer B.1 and a rubber-containing vinyl (co)polymer B.2 is employed as component B, in a particularly preferred embodiment B.2 being employed in component B in a concentration of from 30 to 70 wt. %, particularly preferably in a concentration of from 40 to 60 wt. %, in each case based on the sum of B.1 and B.2.

In a preferred embodiment, components B to D are employed in concentration ratios such that the weight ratio y of free, i.e. not chemically bonded to rubber, vinyl (co)polymer from components B and C to aromatic polyester according to component D is in the range of 0.5 to 6, preferably in the range of from 1 to 5, and particularly preferably in the range of 1.5 to 3. The ratio y is calculated from the contents of components B.1, B.2, C and D ([B.1], [B.2], [C] and [D]) and the gel contents (G) in wt. % of components B.2 and C (GB.2 and GC) according to the following formula:

$$y=([B.1]+[B.2]*(1-(GB.2/100))+[C]*(1-(GC/100)))/[D].$$

In a further preferred embodiment, component D is employed in a concentration of from 5 to 25 wt. %, further preferably from 6 to 20 wt. % and particularly preferably from 8 to 16 wt. %, based on the sum of components A and D.

Component A

Aromatic polycarbonates according to component A which are suitable according to the invention are known from the literature or can be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates e.g. DE-A 3 077 934).

Aromatic polycarbonates are prepared e.g. by reaction of diphenols with carbonic acid halides, preferably phosgene, and/or with aromatic dicarboxylic acid dihalides, preferably benzenedicarboxylic acid dihalides, by the interfacial process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is likewise possible.

Diphenols for the preparation of the aromatic polycarbonates and/or aromatic polyester carbonates are preferably those of the formula (I)

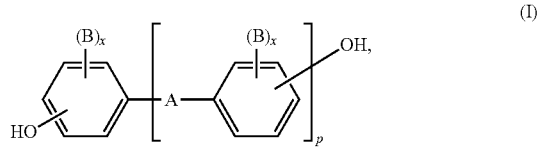

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO_2—, $C_6$ to $C_{12}$-arylene, on to which further aromatic rings optionally containing hetero atoms can be fused, or a radical of the formula (II) or (III)

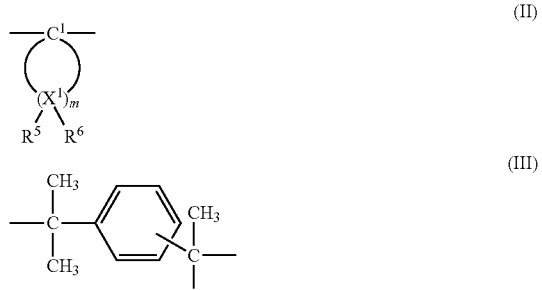

B is in each case $C_1$ to $C_{12}$-alkyl, preferably methyl, halogen, preferably chlorine and/or bromine, x is in each case independently of each other 0, 1 or 2, p is 1 or 0, and R5 and R6 can be chosen individually for each X1 and independently of each other denote hydrogen or C1 to C6-alkyl, preferably hydrogen, methyl or ethyl, X1 denotes carbon and m denotes an integer from 4 to 7, preferably 4 or 5, with the proviso that on at least one atom X1 R5 and R6 are simultaneously alkyl.

Preferred diphenols are hydroquinone, resorcinol, dihydroxydiphenols, bis-(hydroxyphenyl)-C1-C5-alkanes, bis-(hydroxyphenyl)-C5-C6-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)-diisopropylbenzenes and derivatives thereof brominated on the nucleus and/or chlorinated on the nucleus.

Particularly preferred diphenols are 4,4'-dihydroxydiphenyl, bisphenol-A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenols can be employed individually or as any desired mixtures. The diphenols are known from the literature or obtainable by processes known from the literature.

Chain terminators which are suitable for the preparation of the thermoplastic, aromatic polycarbonates are, for example, phenol, p-chlorophenol, p-tert-butylphenol or 2,4,6-tribromophenol, but also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the sum of the moles of the particular diphenols employed.

The thermoplastic, aromatic polycarbonates can be branched in a known manner, and in particular preferably by incorporation of from 0.05 to 2.0 mol %, based on the sum of the diphenols employed, of compounds which are trifunctional or more than trifunctional, for example those having three and more phenolic groups.

Both homopolycarbonates and copolycarbonates are suitable. 1 to 25 wt. %, preferably 2.5 to 25 wt. %, based on the total amount of diphenols to be employed, of polydiorganosiloxanes with hydroxyaryloxy end groups can also be employed for the preparation of the copolycarbonates according to the invention according to component A. These are known (U.S. Pat. No. 3,419,634) and can be prepared by processes known from the literature. The preparation of copolycarbonates containing polydiorganosiloxane is described in DE-A 3 334 782.

Preferred polycarbonates are, in addition to bisphenol A homopolycarbonates, the copolycarbonates of bisphenol A with up to 15 mol %, based on the sum of the moles of diphenols, of other diphenols mentioned as preferred or particularly preferred, in particular 2,2-bis-(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and of naphthalene-2,6-dicarboxylic acid.

Mixtures of the diacid dichlorides of isophthalic acid and of terephthalic acid in a ratio of between 1:20 and 20:1 are particularly preferred.

A carbonic acid halide, preferably phosgene, is additionally co-used as a bifunctional acid derivative in the preparation of polyester carbonates.

Possible chain terminators for the preparation of the aromatic polyester carbonates are, in addition to the monophenols already mentioned, also chlorocarbonic acid esters thereof and the acid chlorides of aromatic monocarboxylic acids, which can optionally be substituted by C1 to C22-alkyl groups or by halogen atoms, and aliphatic C2 to C22-monocarboxylic acid chlorides.

The amount of chain terminators is in each case 0.1 to 10 mol %, based on the moles of diphenol in the case of the phenolic chain terminators and on the moles of dicarboxylic acid dichloride in the case of monocarboxylic acid chloride chain terminators.

The aromatic polyester carbonates can also contain incorporated aromatic hydroxycarboxylic acids.

The aromatic polyester carbonates can be either linear or branched in a known manner (in this context see DE-A 2 940 024 and DE-A 3 007 934).

Branching agents which can be used are, for example, carboxylic acid chlorides which are trifunctional or more than trifunctional, such as trimesic acid trichloride, cyanuric acid trichloride, 3,3',4,4'-benzophenonetetracarboxylic acid tetrachloride, 1,4,5,8-naphthalenetetracarboxylic acid tetrachloride or pyromellitic acid tetrachloride, in amounts of from 0.01 to 1.0 mol-% (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methylphenol, 2-(4-hydroxyphenyl)-2-(2,4-dihydroxyphenyl)-propane, tetra-(4-[4-hydroxyphenylisopropyl]-phenoxy)-methane, 1,4-bis-[4,4'-dihydroxytriphenyl)-methyl]-benzene, in amounts of from 0.01 to 1.0 mol %, based on the diphenols employed. Phenolic branching agents can be initially introduced with the diphenols, and acid chloride branching agents can be introduced together with the acid dichlorides.

The content of carbonate structural units in the thermoplastic, aromatic polyester carbonates can vary as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester carbonates can be present in the polycondensate in the form of blocks or in random distribution.

The relative solution viscosity ($\eta$rel) of the aromatic polycarbonates and polyester carbonates for the preparation of the composition is in the range of 1.18 to 1.4, preferably 1.20 to 1.32, particularly preferably 1.24 to 1.30 (measured on solutions of 0.5 g of polycarbonate or polyester carbonate in 100 ml of methylene chloride solution at 25° C.).

The weight-average molecular weight Mw of the aromatic polycarbonates and polyester carbonates in the composition is preferably in the range of from 15,000 to 35,000, further preferably in the range of from 22,000 to 33,000, particularly preferably 23,000 to 28,000, determined by GPC (gel permeation chromatography in methylene chloride with polycarbonate as the standard).

Component B

Component B includes one or a mixture of several thermoplastic vinyl (co)polymers (B.1) or rubber-modified vinyl (co)polymers (B.2).

Suitable vinyl (co)polymers (B.1) are polymers of at least one monomer from the group of vinylaromatics, vinyl cyanides (unsaturated nitriles), (meth)acrylic acid (C1-C8)-alkyl esters, unsaturated carboxylic acids and derivatives (such as anhydrides and imides) of unsaturated carboxylic acids. (Co)polymers which are suitable in particular are those of B.1.1 50 to 99, preferably 60 to 80 parts by wt. of vinylaromatics and/or vinylaromatics substituted on the nucleus, such as styrene, α-methylstyrene, p-methylstyrene, p-chlorostyrene, and/or (meth)acrylic acid (C1-C8)-alkyl esters, such as methyl methacrylate, ethyl methacrylate, and B.1.2 1 to 50, preferably 20 to 40 parts by wt. of vinyl cyanides (unsaturated nitriles), such as acrylonitrile and methacrylonitrile, and/or (meth)acrylic acid (C1-C8)-alkyl esters, such as methyl methacrylate, n-butyl acrylate, t-butyl acrylate, and/or unsaturated carboxylic acids, such as maleic acid, and/or derivatives, such as anhydrides and imides, of unsaturated carboxylic acids, for example maleic anhydride and N-phenylmaleimide.

The vinyl (co)polymers are resinous, thermoplastic and rubber-free. The copolymer of B.1.1 styrene and B.1.2 acrylonitrile is particularly preferred.

The rubber-free (co)polymers according to B.1 are known and can be prepared by free radical polymerization, in particular by emulsion, suspension, solution or bulk polymerization.

The (co)polymers preferably have average molecular weights Mw (weight-average, determined by gel permeation chromatography (GPC) in acetone as the solvent and with polystyrene as the standard)) of from 15,000 and 200,000 g/mol, particularly preferably between 80,000 and 150,000 g/mol.

In a particularly preferred embodiment, B.1 is a copolymer of 75 to 80 wt. % of styrene and 20 to 25 wt. % of acrylonitrile having a weight-average molecular weight Mw of from 80,000 to 130,000 g/mol.

The rubber-modified vinyl (co)polymers employed as component B.2 include graft polymers with a rubber-elastic graft base, the grafting being carried out in the bulk, solution or suspension polymerization process. Preferred graft polymers according to component B.2 include graft polymers of:

B.2.1) 70 to 95 parts by wt., preferably 80 to 93 parts by wt., in particular 85 to 90 parts by wt. of a mixture of B.2.1.1) 50 to 95 parts by wt., preferably 70 to 80 parts by wt. of styrene, α-methylstyrene, styrene substituted on the nucleus by methyl, C1-C8-alkyl methacrylate, in particular methyl methacrylate, C1-C8-alkyl acrylate, in particular methyl acrylate, or mixtures of these compounds and B.2.1.2) 5 to 50 parts by wt., preferably 20 to 30 parts by wt. of acrylonitrile, methacrylonitrile, C1-C8-alkyl methacrylates, in particular methyl methacrylate, C1-C8-alkyl acrylates, in particular methyl acrylate, maleic anhydride, maleimides N-substituted by C1-C4-alkyl or phenyl or mixtures of these compounds on B.2.2) 5 to 30 parts by wt., preferably 7 to 20 parts by wt., in particular 10 to 15 parts by wt. of a rubber-elastic graft base.

Preferably, the graft base B.2.2) has a glass transition temperature below −10° C., in particular below −50° C.

A graft base B.2.2) based on a pure polybutadiene rubber or a polybutadiene/styrene (SBR) copolymer rubber is particularly preferred, it being possible for the two different monomers in the latter to be arranged either in monomer blocks or randomly. Mixtures of various such rubbers can also be employed as the graft base B.2.2).

Preferred graft polymers according to component B.2 are, in particular, polybutadienes and/or butadiene/styrene copolymers grafted with styrene and/or acrylonitrile and/or (meth)acrylic acid alkyl esters. The gel content of the graft base B.2.2) is preferably at least 70 wt. % (measured in toluene).

The average particle diameter d50 of the graft polymer B.2 is preferably 0.3 to 5 µm, in particular 0.4 to 1.5 µm.

Preferred graft polymers B.2 have gel contents (measured in toluene) of from 10 to 50 wt. %, preferably from 15 to 40 wt. %, in particular from 20 to 30 wt. %.

Since as is generally known the grafting monomers are not necessarily grafted completely on to the graft base during the grafting reaction, according to the present invention, graft polymers B.2 are also understood as meaning those products which can be produced by (co)polymerization of the grafting monomers in the presence of the graft base and are also obtained during the working up. These products can accordingly also contain free, i.e. not bonded chemically to the rubber, (co)polymer of the grafting monomers.

The average particle size d50 is the diameter above and below which in each case 50 wt. % of the particles lie. Unless stated otherwise in the present invention, it can be determined by means of ultracentrifuge measurements (W. Scholtan, H. Lange, Kolloid, Z. und Z. Polymere 250 (1972), 782-796).

Unless stated otherwise in the present invention, the glass transition temperature is generally determined by means of dynamic differential thermoanalysis (DSC) in accordance with the standard DIN EN 61006 at a heating rate of 10K/min with definition of the Tg as the midpoint temperature (tangent method) with nitrogen as the inert gas.

The gel contents of the graft polymer and of the graft base are determined at 25° C. in a suitable solvent (preferably toluene) as the content insoluble in this solvent (M. Hoffmann, H. Krömer, R. Kuhn, Polymeranalytik I und II, Georg Thieme-Verlag, Stuttgart 1977).

Component C

Component C is a graft polymer or a mixture of several graft polymers prepared in the emulsion polymerization process. Graft polymers which are preferably employed as component C include one or more graft polymers of C.1 5 to 80, preferably 20 to 70, in particular 30 to 50 wt. %, based on component C, of at least one vinyl monomer on C.2 95 to 20, preferably 80 to 30, in particular 70 to 50 wt. %, based on component C, of one or more rubber-like graft bases, the glass transition temperatures of the graft bases preferably being <10° C., further preferably <0° C., particularly preferably <−20° C.

The graft base C.2 preferably has an average particle size (d50 value) of from 0.05 to 2 µm, further preferably 0.1 to 1 µm, and particularly preferably 0.15 to 0.6 µm.

Monomers C.1 are preferably mixtures of

C.1.1 50 to 99, preferably 60 to 80, in particular 70 to 80 parts by wt., based on C.1, of vinylaromatics and/or vinylaromatics substituted on the nucleus (such as styrene, α-methylstyrene, p-methylstyrene, p-chlorostyrene) and/or methacrylic acid (C1-C8)-alkyl esters (such as methyl methacrylate, ethyl methacrylate) and C.1.2 1 to 50, preferably 20 to 40, in particular 20 to 30 parts by wt., based on C.1, of vinyl cyanides (unsaturated nitriles, such as acrylonitrile and methacrylonitrile) and/or (meth)acrylic acid (C1-C8)-alkyl esters, such as methyl methacrylate, n-butyl acrylate, t-butyl acrylate, and/or derivatives (such as anhydrides and imides) of unsaturated carboxylic acids, for example maleic anhydride and N-phenylmaleimide.

Preferred monomers C.1.1 are chosen from at least one of the monomers styrene, α-methylstyrene and methyl methacrylate, and preferred monomers C.1.2 are chosen from at least one of the monomers acrylonitrile, maleic anhydride and methyl methacrylate. Particularly preferred monomers are C.1.1 styrene and C.1.2 acrylonitrile. In a further preferred embodiment, C.1.1 and C.1.2 are methyl methacrylate. In a further preferred embodiment, C.1.1 is styrene and C.1.2 is methyl methacrylate.

Graft bases C.2 which are suitable for the graft polymers C are, for example, diene rubbers, EP(D)M rubbers, that is to say those based on ethylene/propylene and optionally diene, and acrylate, polyurethane, silicone, chloroprene and ethylene/vinyl acetate rubbers and silicone/acrylate composite rubbers.

Preferred graft bases C.2 are diene rubbers, for example based on butadiene and isoprene, or mixtures of diene rubbers or copolymers of diene rubbers or mixtures thereof with further copolymerizable monomers (e.g. according to C.1.1 and C.1.2).

Pure polybutadiene rubber is particularly preferred.

Particularly preferred polymers C are, for example, ABS or MBS polymers.

Particularly suitable graft polymers C have a core-shell structure.

The gel content of the graft base C.2 is advantageously at least 30 wt. %, preferably at least 70 wt. %, in particular at least 80 wt. % (measured in toluene).

The gel content of the graft polymer C is advantageously at least 30 wt. %, preferably at least 50 wt. %, in particular at least 80 wt. % (measured in toluene).

Since as is known the grafting monomers are not necessarily grafted completely on to the graft base during the grafting reaction, according to the invention, graft polymers C are also understood as meaning those products which can be produced by (co)polymerization of the grafting monomers in the presence of the graft base and are also obtained during the working up. These products can accordingly also contain free, i.e. not bonded chemically to the rubber, (co)polymer of the grafting monomers.

Suitable acrylate rubbers according to C.2 are preferably polymers of acrylic acid alkyl esters, optionally with up to 40 wt. %, based on C.2, of other polymerizable, ethylenically unsaturated monomers. The preferred polymerizable acrylic acid esters include C1 to C8-alkyl esters, for example methyl, ethyl, butyl, n-octyl and 2-ethylhexyl esters; haloalkyl esters, preferably halo-$C_1$-$C_8$-alkyl esters, such as chloroethyl acrylate, and mixtures of these monomers.

For crosslinking, monomers having more than one polymerizable double bond can be copolymerized. Preferred examples of crosslinking monomers are esters of unsaturated monocarboxylic acids having 3 to 8 C atoms and unsaturated monofunctional alcohols having 3 to 12 C atoms, or of saturated polyols having 2 to 4 OH groups and 2 to 20 C atoms, such as ethylene glycol dimethacrylate, allyl methacrylate; polyunsaturated heterocyclic compounds, such as trivinyl and triallyl cyanurate; polyfunctional vinyl compounds, such as di- and trivinylbenzenes; but also triallyl phosphate and diallyl phthalate. Preferred crosslinking monomers are allyl methacrylate, ethylene glycol dimethacrylate, diallyl phthalate and heterocyclic compounds which contain at least three ethylenically unsaturated groups. Particularly preferred crosslinking monomers are the cyclic monomers triallyl cyanurate, triallyl isocyanurate, triacryloylhexahydro-s-triazine, triallylbenzenes. The amount of the crosslinking monomers is preferably 0.02 to 5, in particular 0.05 to 2 wt. %, based on the graft base C.2. In the case of cyclic crosslinking monomers having at least three ethylenically unsaturated groups, it may be advantageous to limit the amount to less than 1 wt. % of the graft base C.2.

Preferred "other" polymerizable, ethylenically unsaturated monomers which can optionally serve for preparation of the graft base C.2 in addition to the acrylic acid esters are e.g. acrylonitrile, styrene, α-methylstyrene, acrylamides, vinyl C1-C6-alkyl ethers, methyl methacrylate, butadiene. Preferred acrylate rubbers as the graft base C.2 are emulsion polymers which have a gel content of at least 60 wt. %.

Further suitable graft bases according to C.2 are silicone rubbers having grafting-active sites, such as are described in DE-OS 3 704 657, DE-OS 3 704 655, DE-OS 3 631 540 and DE-OS 3 631 539.

In a particularly preferred embodiment, the graft polymers according to component C are those based on silicone/acrylate composite rubbers as the graft base C.2.

In a preferred embodiment, the silicone/acrylate composite rubbers employed as the graft base C.2 contain or comprise
- C.2.1 20 to 80 wt. %, particularly preferably 30 to 70 wt. %, especially preferably 40 to 60 wt. % of silicone rubber and
- C.2.2 80 to 20 wt. %, particularly preferably 30 to 70 wt. %, especially preferably 40 to 60 wt. % of polyalkyl(meth)acrylate rubber,
- wherein the two rubber components C.2.1 and C.2.2 mentioned are preferably mutually penetrating in the composite rubber, so that they cannot be separated substantially from one another.

The silicone rubber is prepared by emulsion polymerization, in which siloxane monomer units, crosslinking or branching agents (IV) and optionally grafting agents (V) are employed.

Siloxane monomer units which are employed are, for example and preferably, dimethylsiloxane or cyclic organosiloxanes having at least 3 ring members, preferably 3 to 6 ring members, such as, for example and preferably, hexamethylcyclotrisiloxane, octamethylcyclotetrasiloxane, decamethylcyclopentasiloxane, dodecamethylcyclohexasiloxane, trimethyltriphenylcyclotrisiloxanes, tetramethyltetraphenylcyclotetrasiloxanes and octaphenylcyclotetrasiloxane.

The organosiloxane monomers can be employed by themselves or in the form of mixtures with 2 or more monomers. The silicone rubber preferably contains not less than 50 wt. % and particularly preferably not less than 60 wt. % of organosiloxane, based on the total weight of the silicone rubber component.

Silane-based crosslinking agents having a functionality of 3 or 4, particularly preferably 4, are preferably used as crosslinking or branching agents (IV). There may be mentioned by way of example and preferably: trimethoxymethylsilane, triethoxyphenylsilane, tetramethoxysilane, tetraethoxysilane, tetra-n-propoxysilane and tetrabutoxysilane. The crosslinking agent can be employed by itself or in a mixture of two or more. Tetraethoxysilane is particularly preferred.

The crosslinking agent is employed in a range of amounts of between 0.1 and 40 wt. %, based on the total weight of the silicone rubber component. The amount of crosslinking agent is chosen such that the degree of swelling of the silicone rubber, measured in toluene, is preferably between 3 and 30, particularly preferably between 3 and 25, and in particular between 3 and 15. The degree of swelling is defined as the weight ratio between the amount of toluene which is absorbed by the silicone rubber when it is saturated with toluene at 25° C. and the amount of silicone rubber in the dried state. The determination of the degree of swelling is described in detail in EP 249964.

If the degree of swelling is less than 3, i.e. if the content of crosslinking agent is too high, the silicone rubber may not show an adequate rubber elasticity. If the swelling index is greater than 30, the silicone rubber may not be able to form a domain structure in the matrix polymer and therefore also cannot improve the impact strength, and the effect would then be similar to simple addition of polydimethylsiloxane.

Tetrafunctional crosslinking agents are preferred over trifunctional, because the degree of swelling can then be controlled more easily within the limits described above.

Suitable grafting agents (V) include compounds which are capable of forming structures of the following formulae:

wherein
$R^1$ represents $C_1$-$C_4$-alkyl, preferably methyl, ethyl or propyl, or phenyl,
$R^2$ represents hydrogen or methyl,
n denotes 0, 1 or 2 and
P denotes an integer from 1 to 6.

Acryloyl- or methacryloyloxysilanes are particularly suitable for forming the abovementioned structure (V-1) and have a high grafting efficiency. An effective formation of the graft chains is thereby typically ensured, and the impact strength of the resulting resin composition is therefore promoted.

There may be mentioned by way of example and preferably: β-methacryloyloxy-ethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, δ-methacryloyloxy-butyldiethoxymethylsilanes or mixtures of these.

0 to 20 wt. % of grafting agent, based on the total weight of the silicone rubber, is preferably employed.

Suitable polyalkyl(meth)acrylate rubber components of the silicone/acrylate rubbers can be prepared from methacrylic acid alkyl esters and/or acrylic acid alkyl esters, a crosslinking agent (VI) and a grafting agent (VII). Preferred methacrylic acid alkyl esters and/or acrylic acid alkyl esters by way of example here are the C1 to C8-alkyl esters, for example methyl, ethyl, n-butyl, t-butyl, n-propyl, n-hexyl n-octyl, n-lauryl and 2-ethylhexyl esters; haloalkyl esters, preferably halo-C1-C8-alkyl esters, such as chloroethyl acrylate, and mixtures of these monomers. n-Butyl acrylate is particularly preferred.

Crosslinking agents (VI) which can be employed for the polyalkyl(meth)acrylate rubber component of the silicone/acrylate rubber are monomers having more than one polymerizable double bond. Preferred examples of crosslinking monomers are esters of unsaturated monocarboxylic acids having 3 to 8 C atoms and unsaturated monofunctional alcohols having 3 to 12 C atoms, or of saturated polyols having 2 to 4 OH groups and 2 to 20 C atoms, such as ethylene glycol dimethacrylate, propylene glycol dimethacrylate, 1,3-butylene glycol dimethacrylate and 1,4-butylene glycol dimethacrylate. The crosslinking agents can be used by themselves or in mixtures of at least two crosslinking agents.

Preferred grafting agents (VII) by way of example are allyl methacrylate, triallyl cyanurate, triallyl isocyanurate or mixtures thereof. Allyl methacrylate can also be employed as the crosslinking agent (VI). The grafting agents can be used by themselves or in mixtures of at least two grafting agents.

The amount of crosslinking agent (VI) and grafting agent (VII) is 0.1 to 20 wt. %, based on the total weight of the polyalkyl(meth)acrylate rubber component of the silicone/acrylate rubber.

The silicone/acrylate rubber can be prepared by first preparing the silicone rubber as an aqueous latex. In this context, the silicone rubber is prepared by emulsion polymerization, as described, for example, in U.S. Pat. No. 2,891,920 and U.S. Pat. No. 3,294,725. For this, a mixture containing organosiloxane, crosslinking agent and optionally grafting agent is mixed with water under the action of shearing forces, for example by a homogenizer, in the presence of an emulsifier, preferably based on a sulfonic acid, such as e.g. alkylbenzenesulfonic acid or alkylsulfonic acid, the mixture polymerizing to give the silicone rubber latex. An alkylbenzenesulfonic acid is particularly suitable, since it acts not only as an emulsifier but also as a polymerization initiator. In this case, a combination of the sulfonic acid with a metal salt of an alkylbenzenesulfonic acid or with a metal salt of an alkylsulfonic acid is favourable, because the polymer is thereby stabilized during the later grafting polymerization.

After the polymerization, the reaction is ended by neutralizing the reaction mixture by addition of an aqueous alkaline solution, e.g. by addition of an aqueous sodium hydroxide, potassium hydroxide or sodium carbonate solution.

This latex is then enriched with the methacrylic acid alkyl esters and/or acrylic acid alkyl esters to be used, the crosslinking agent (VI) and the grafting agent (VII), and a polymerization is carried out. An emulsion polymerization initiated by free radicals, for example by a peroxide, an azo or redox initiator, is preferred. The use of a redox initiator system, specifically of a sulfoxylate initiator system prepared by combination of iron sulfate, disodium ethylenediaminetetraacetate, Rongalit and hydroperoxide, is particularly preferred.

The grafting agent (V) used in the preparation of the silicone rubber leads in this context to the polyalkyl(meth)acrylate rubber content being bonded covalently to the silicone rubber content. During the polymerization, the two rubber components penetrate each other and in this way form the composite rubber, which can no longer be separated into its constituents of silicone rubber component and polyalkyl(meth)acrylate rubber component after the polymerization.

For preparation of the silicone/acrylate graft rubbers C, the monomers C.1 are grafted on to the rubber base C.2.

In this context, the polymerization methods described, for example, in EP 249964, EP 430134 and U.S. Pat. No. 4,888,388 can be used.

For example, the grafting polymerization is carried out by the following polymerization method: The desired vinyl monomers C.1 are polymerized on to the graft base, which is in the form of an aqueous latex, in a one- or multistage emulsion polymerization initiated by free radicals. The grafting efficiency in this context should preferably be as high as possible and is preferably greater than or equal to 10%. The grafting efficiency depends decisively on the grafting agents (V) and (VII) used. After the polymerization to give the silicone/acrylate graft rubber, the aqueous latex is introduced into hot water, in which metal salts, such as e.g. calcium chloride or magnesium sulfate, have been dissolved beforehand. The silicone/acrylate graft rubber coagulates during this procedure and can then be separated.

Component D

The polyesters possible according to the invention as component D are preferably aromatic polyesters, and in a preferred embodiment polyalkylene terephthalates. In a particularly preferred embodiment, these are reaction products of aromatic dicarboxylic acids or their reactive derivatives, such as dimethyl esters or anhydrides, and aliphatic, cycloaliphatic or araliphatic diols, and mixtures of these reaction products.

Particularly preferred polyalkylene terephthalates contain at least 80 wt. %, preferably at least 90 wt. %, based on the dicarboxylic acid component, of terephthalic acid radicals and at least 80 wt. %, preferably at least 90 mol %, based on the diol component, of radicals of ethylene glycol and/or butane-1,4-diol.

The preferred polyalkylene terephthalates can contain, in addition to terephthalic acid radicals, up to 20 mol %, preferably up to 10 mol %, of radicals of other aromatic or cycloaliphatic dicarboxylic acids having 8 to 14 C atoms or aliphatic dicarboxylic acids having 4 to 12 C atoms, such as e.g. radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

The preferred polyalkylene terephthalates can contain, in addition to radicals of ethylene glycol or butane-1,4-diol, up to 20 mol %, preferably up to 10 mol %, of other aliphatic diols having 3 to 12 C atoms or cycloaliphatic diols having 6 to 21 C atoms, e.g. radicals of propane-1,3-diol, 2-ethylpropane-1,3-diol, neopentyl glycol, pentane-1,5-diol, hexane-1,6-diol, cyclohexane-1,4-dimethanol, 3-ethylpentane-2,4-diol, 2-methylpentane-2,4-diol, 2,2,4-trimethylpentane-1,3-diol, 2-ethylhexane-1,3-diol, 2,2-diethylpropane-1,3-diol, hexane-2,5-diol, 1,4-di-($\beta$-hydroxyethoxy)-benzene, 2,2-bis-(4-hydroxycyclohexyl)-propane, 2,4-dihydroxy-1,1,3,3-tetramethylcyclobutane, 2,2-bis-(4-$\beta$-hydroxyethoxyphenyl)-propane and 2,2-bis-(4-hydroxypropoxyphenyl)-propane (DE-A 2 407 674, 2 407 776, 2 715 932).

The polyalkylene terephthalates can be branched by incorporation of relatively small amounts of 3- or 4-functional alcohols or 3- or 4-basic carboxylic acids, e.g. in accordance with DE-A 1 900 270 and U.S. Pat. No. 3,692,744. Examples of preferred branching agents are trimesic acid, trimellitic acid, trimethylolethane and -propane and pentaerythritol.

Polyalkylene terephthalates which have been prepared solely from terephthalic acid and reactive derivatives thereof (e.g. dialkyl esters thereof) and ethylene glycol and/or butane-1,4-diol, and mixtures of these polyalkylene terephthalates are particularly preferred.

Mixtures of polyalkylene terephthalates advantageously contain 1 to 50 wt. %, preferably 1 to 30 wt. % of polyethylene terephthalate and 50 to 99 wt. %, preferably 70 to 99 wt. % of polybutylene terephthalate.

Polybutylene terephthalate is particularly preferably used as component D.

The polyalkylene terephthalates preferably used preferably have a viscosity number of from 0.4 to 1.5 dl/g, preferably 0.5 to 1.2 dl/g, measured in phenol/o-dichlorobenzene (1:1 parts by weight) in a concentration of 0.05 g/ml in accordance with ISO 307 at 25° C. in an Ubbelohde viscometer.

The polyalkylene terephthalates can be prepared by known methods (see e.g. Kunststoff-Handbuch, volume VIII, p. 695 et seq., Carl-Hanser-Verlag, Munich 1973).

Component E

The thermoplastic moulding compositions can contain as component E a filler or reinforcing substance or a mixture of at least two different fillers and/or reinforcing substances, for example chosen from the group containing talc, mica, silicate, quartz, titanium dioxide, wollastonite, kaolin, amorphous silicas, magnesium carbonate, chalk, feldspar, barium sulfate, glass beads, ceramic beads, carbon fibres and glass fibres. In a preferred embodiment, platelet-shaped fillers, particularly preferably fillers based on talc, are employed as the filler and reinforcing substance.

Possible mineral fillers based on talc in the context of the present invention are all the particulate fillers which the person skilled in the art associates with talc or talcum. All particulate fillers which are commercially available and of which the product descriptions contain the terms talc or talcum as characterizing features are likewise possible.

Mineral fillers which have a content of talc in accordance with DIN 55920 of greater than 50 wt. %, preferably greater than 80 wt. %, particularly preferably greater than 95 wt. % and especially preferably greater than 98 wt. %, based on the total weight of filler, are preferred.

Talc is understood as meaning a naturally occurring or synthetically prepared talc.

Pure talc has the chemical composition 3 $MgO.4 SiO_2.H_2O$ and therefore has an MgO content of 31.9 wt. %, an $SiO_2$ content of 63.4 wt. % and a content of chemically bonded water of 4.8 wt. %. It is a silicate having a laminar structure.

Naturally occurring talc materials in general do not have the abovementioned ideal composition, since they are contaminated by replacement of some of the magnesium by other elements, by replacement of some of the silicon by e.g. aluminium and/or by intergrowths with other minerals, such as e.g. dolomite, magnesite and chlorite.

The particularly preferred varieties of talc employed as component E are distinguished by a particularly high purity, characterized by an MgO content of from 28 to 35 wt. %, preferably 30 to 33 wt. %, particularly preferably 30.5 to 32 wt. % and an $SiO_2$ content of from 55 to 65 wt. %, preferably 58 to 64 wt. %, particularly preferably 60 to 62.5 wt. %. Particularly preferred talc types are furthermore distinguished by an $Al_2O_3$ content of less than 5 wt. %, particularly preferably less than 1 wt. %, in particular less than 0.7 wt. %.

The use of the talc according to the invention in the form of finely ground types having an average particle size d50 of from 0.1 to 20 preferably 0.2 to 10 further preferably 0.5 to 5 still further preferably 0.7 to 2.5 and particularly preferably 1.0 to 2.0 μm in particular is advantageous, and in this respect preferred.

The mineral fillers based on talc which are to be employed according to the present invention preferably have an upper particle or grain size d97 of less than 50 preferably less than 10 particularly preferably less than 6 μm and especially preferably less than 2.5 μm. The d97 and d50 values of the fillers are determined by sedimentation analysis with a SEDIGRAPH D 5 000 in accordance with ISO 13317-3.

The mineral fillers based on talc can optionally be treated on the surface in order to achieve a better coupling to the polymer matrix. They can be provided, for example, with an adhesion promoter system based on functionalized silanes.

Due to the processing to the moulding composition or to shaped articles, the particulate fillers in the moulding composition or in the shaped article can have a lower d97 or d50 value than the fillers originally employed.

Component F

The composition contains commercially available polymer additives as component F.

Possible commercially available polymer additives according to component F are additives such as, for example, flameproofing agents (for example phosphorus compounds or halogen compounds), flameproofing synergists (for example nanoscale metal oxides), smoke-suppressing additives (for example boric acid or borates), antidripping agents (for example compounds from the substance classes of fluorinated polyolefins, of silicones and aramid fibres), internal and external lubricants and mould release agents (for example pentaerythritol tetrastearate, montan wax or polyethylene wax), flowability auxiliary agents, antistatics (for example block copolymers of ethylene oxide and propylene oxide, other polyethers or polyhydroxy ethers, polyether amides, polyester amides or sulfonic acid salts), conductivity additives (for example conductive carbon black or carbon nanotubes), stabilizers (for example UV/light stabilizers, heat stabilizers, antioxidants, transesterification inhibitors, agents which prevent hydrolysis), antibacterially acting additives (for example silver or silver salts), additives which improve scratch resistance (for example silicone oils), IR absorbents, optical brighteners, fluorescent additives, and dyestuffs and pigments (for example carbon black, titanium dioxide or iron oxide), or mixtures of several of the additives mentioned.

The compositions according to the invention particularly preferably contain at least one mould release agent, preferably pentaerythritol tetrastearate, and at least one stabilizer, preferably a phenolic antioxidant, particularly preferably 2,6-di-tert-butyl-4-(octadecanoxycarbonylethyl)-phenol.

Further preferably, a stabilizer combination of at least two stabilizers is employed, the second stabilizer containing a Brønsted acid compound. The second stabilizer is preferably phosphoric acid, aqueous phosphoric acid solution or a free-flowing mixture of phosphoric acid or an aqueous phosphoric acid solution with a finely divided hydrophilic silica gel.

The present invention furthermore relates to shaped parts produced from the abovementioned compositions, preferably flat shaped parts, such as sheets and vehicle body parts, such as mirror housings, mudguards, spoilers, bonnets etc. which have a coating with a polyurethane system (PU system) at least on one side of the base produced from the composition according to the invention.

In this context, the polyurethane layer can be, for example, a PU lacquer, a PU foam or a compact PU skin with polyurethane layer thicknesses of from, for example, 1 μm up to 20 cm.

In a preferred embodiment, the polyurethane layer is a lacquer with a layer thickness of 1-1,000 μm, preferably 5-100 μm, particularly preferably 10-60 μm.

In a further preferred embodiment, the polyurethane layer is a compact skin with a layer thickness of 1 mm-10 mm.

In a further preferred embodiment, the polyurethane layer is a foam with a layer thickness of 4 mm-20 cm.

The composite components can in principle be produced from the base (support of the thermoplastic composition according to the invention) and polyurethane layer in any known manner.

Preferably, the polyurethane layer is produced by complete polymerization of a reactive polyurethane raw material mixture comprising
 at least one polyisocyanate component,
 at least one polyfunctional H-active compound, and
 optionally at least one polyurethane additive and/or process auxiliary substance
in direct contact with the support formed and solidified beforehand from the thermoplastic composition.

The support component can be prefabricated, for example, from the composition according to the invention and the reactive polyurethane raw material mixture can be applied thereto and reacted completely. Depending on the reactivity of the polyurethane reaction components, these can be already premixed or mixed in a known manner during the application. The application can be carried out, inter alia, by spraying, knife coating or calendering.

In a preferred embodiment, before application of the reactive polyurethane mixture the support surface is cleaned, preferably with isopropanol, and further preferably additionally subjected to a flame treatment for activation of the surface.

However, it is also possible to produce the composites according to the invention by coextrusion by known methods.

In the case where foamed composites are to be produced, the reaction mixture can be introduced in a manner known per se into a mould containing the previously formed and solidified support component. The mould can optionally also contain a further decorative layer (often called "skin") of e.g. polyvinyl chloride (PVC), thermoplastic polyolefins (TPO), thermoplastic polyurethane (TPU) or polyurethane spray skin. In the mould, the foamable reaction mixture foams in contact with the support component and optionally the decorative layer and forms the composite component. In this context, the foam moulding can be carried out such that the composite component has a cell structure on its surface. However, it can also be carried out such that the composite component has a compact skin and a cellular core (integral foams). The polyurethane components can be introduced into the mould with high pressure or low pressure machines.

Polyurethane foams can also be produced as a block foam.

Polyurethane composite bodies can also be produced in a sandwich construction. In this context, the process can be equipped as a depot or envelope construction process. Both the deposit construction method and the envelope construction method are known per se. In the deposit process (filling construction method), two half-shells (e.g. top layers of plastics) are prefabricated and laid in a mould and the hollow cavity between the shells is filled with the PU foam by foaming. In the envelope construction method, a core of PU foam is initially introduced into a mould and then surrounded by a suitable envelope material, e.g. by one of the thermoplastics mentioned. The envelope construction method is preferred for the production of sandwich composite bodies.

In a specific embodiment of the invention, the composite components are produced by a process in which (i) in a first process step the melt of the thermoplastic composition is injected into a first mould cavity and is subsequently cooled, (ii) in a second process step the cavity of the injection mould is increased in size and a gap is thereby generated, (iii) in the third process step a reactive polyurethane raw material mixture comprising at least one polyisocyanate component,
at least one polyfunctional H-active compound, and
optionally at least one polyurethane additive and/or process auxiliary substance is injected into the gap resulting in this way between the thermoplastic component and the mould surface of the enlarged cavity, the polyurethane raw material mixture polymerizing completely in direct contact with the surface of the thermoplastic support to give a compact polyurethane layer or to give a polyurethane foam layer, and (iv) in the fourth process step the composite component is removed from the mould cavity.

Polyurethanes

A polyurethane foam or a compact polyurethane layer is preferably employed as the coating.

The polyurethanes employed according to the invention are obtained by reaction of polyisocyanates with H-active polyfunctional compounds, preferably polyols.

In this context, the term "polyurethane" is understood in the context of this invention as also meaning polyurethane-ureas, in which those compounds with N—H functionality, optionally in a mixture with polyols, are employed as H-active polyfunctional compounds.

Suitable polyisocyanates are the aromatic, araliphatic, aliphatic or cycloaliphatic polyisocyanates known per se to the person skilled in the art having an NCO functionality of preferably ≥2, which can also contain iminooxadiazinedione, isocyanurate, uretdione, urethane, allophanate, biuret, urea, oxadiazinetrione, oxazolidinone, acylurea and/or carbodiimide structures. These can be employed individually or in any desired mixtures with one another.

In this context, the abovementioned polyisocyanates are based on di- and triisocyanates which are known per se to the person skilled in the art and have aliphatically, cycloaliphatically, araliphatically and/or aromatically bonded isocyanate groups, it being irrelevant whether these have been prepared using phosgene or by phosgene-free processes. Examples of such di- and triisocyanates are 1,4-diisocyanatobutane, 1,5-diisocyanatopentane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)-cyclohexane, 1-isocyanato-3,3,5-trimethyl-5-isocyanatomethylcyclohexane (isophorone-diisocyanate, IPDI), 4,4'-di-isocyanatodicyclohexylmethane (Desmodur® W, Bayer AG, Leverkusen, DE), 4-isocyanatomethyl-1,8-octane-diisocyanate (triisocyanatononane, TIN), ω,ω'-diisocyanato-1,3-dimethylcyclohexane (H6XDI), 1-isocyanato-1-methyl-3-isocyanatomethylcyclohexane, 1-isocyanato-1-methyl-4-isocyanatomethylcyclohexane, bis-(isocyanatomethyl)-norbornane, 1,5-naphthalene-diisocyanate, 1,3- and 1,4-bis-(2-isocyanatoprop-2-yl)-benzene (TMXDI), 2,4- and 2,6-diisocyanatotoluene (TDI), in particular the 2,4 and the 2,6 isomer and technical grade mixtures of the two isomers, 2,4'- and 4,4'-diisocyanato-diphenylmethane (MDI), polymeric MDI (pMDI), 1,5-diisocyanatonaphthalene, 1,3-bis(isocyanatomethyl)benzene (XDI) and any desired mixtures of the compounds mentioned.

In this context, the polyisocyanates preferably have an average NCO functionality of from 2.0 to 5.0, preferably from 2.2 to 4.5, particularly preferably from 2.2 to 2.7, and a content of isocyanate groups of from 5.0 to 37.0 wt. %, preferably from 14.0 to 34.0 wt. %.

In a preferred embodiment, polyisocyanates or polyisocyanate mixtures of the abovementioned type with exclusively aliphatically and/or cycloaliphatically bonded isocyanate groups are employed.

Very particularly preferably, the polyisocyanates of the abovementioned type are based on hexamethylene-diisocyanate, isophorone-diisocyanate, the isomeric bis-(4,4'-isocyanatocyclohexyl)-methanes and mixtures thereof Among the higher molecular weight, modified polyisocyanates, the prepolymers known from polyurethane chemistry having terminal isocyanate groups of the molecular weight range of 400 to 15,000, preferably 600 to 12,000 are of interest in particular. These compounds are prepared in a manner known per se by reaction of excess amounts of simple polyisocyanates of the type mentioned by way of example with organic compounds having at least two groups which are reactive towards isocyanate groups, in particular organic polyhydroxy compounds. Suitable such polyhydroxy compounds are both simple polyfunctional alcohols of the molecular weight range of 62 to 599, preferably 62 to 200, such as e.g. ethylene glycol, trimethylolpropane, propane-1,2-diol or butane-1,4-diol or butane-2,3-diol, but in particular higher molecular weight polyether polyols and/or polyester polyols of the type known per se from polyurethane chemistry with molecular weights of from 600 to 12,000, preferably 800 to 4,000, which have at least two, as a rule 2 to 8, but preferably 2 to 6 primary and/or secondary hydroxyl groups. Those NCO prepolymers which have been obtained, for example, from low molecular weight polyisocyanates of the type mentioned by way of example and less preferred compounds having groups which are reactive towards isocyanate groups, such as e.g. polythioether polyols, polyacetals containing hydroxyl groups, polyhydroxy-polycarbonates, polyesteramides containing hydroxyl groups or copolymers, containing hydroxyl groups, of olefinically unsaturated compounds, can of course also be employed.

Compounds which have groups which are reactive towards isocyanate groups, in particular hydroxyl, and are suitable for the preparation of the NCO prepolymers are, for example, the compounds disclosed in U.S. Pat. No. 4,218,543. In the preparation of the NCO prepolymers, these compounds having groups which are reactive towards isocyanate groups are reacted with simple polyisocyanates of the type mentioned above by way of example, while maintaining an NCO excess. The NCO prepolymers in general have an NCO content of from 10 to 26, preferably 15 to 26 wt. %. It already emerges from this that in the context of the present invention, "NCO prepolymers" or "prepolymers having terminal isocyanate groups" are to be understood as meaning both the reaction products as such and the mixtures with excess amounts of unreacted starting polyisocyanates, which are often also called "semi-prepolymers".

Possible aliphatic diols having an OH number of >500 mg of KOH/g are the chain lengtheners conventionally used in polyurethane chemistry, such as ethylene glycol, diethylene glycol, propylene glycol, dipropylene glycol, butane-1,4-diol, propane-1,3-diol. Diols, such as 2-butane-1,4-diol, butene-1,3-diol, butane-2,3-diol and/or 2-methylpropane-1,3-diol, are preferred. It is of course also possible to employ the aliphatic diols in a mixture with one another.

Suitable H-active components are polyols having an average OH number of from 5 to 600 mg of KOH/g and an average functionality of from 2 to 6. Polyols having an average OH number of from 10 to 50 mg of KOH/g are preferred. Polyols which are suitable according to the invention are, for example, polyhydroxy-polyethers, which are accessible by alkoxylation of suitable starter molecules, such as ethylene glycol, diethylene glycol, 1,4-dihydroxybutane, 1,6-dihydroxyhexane, dimethylolpropane, glycerol, pentaerythritol, sorbitol or sucrose Ammonia or amines, such as ethylenediamine, hexamethylenediamine, 2,4-diaminotoluene, aniline or amino alcohols, or phenols, such as bisphenol A, can likewise function as starters. The alkoxylation is carried out using propylene oxide and/or ethylene oxide in any desired sequence or as a mixture.

In addition to polyols, at least one further crosslinking agent and/or chain lengthener chosen from the group which contains amines and amino alcohols, for example ethanolamine, diethanolamine, diisopropanolamine, ethylenediamine, triethanolamine, isophoronediamine, N,N'-dimethyl (diethyl)-ethylenediamine, 2-amino-2-methyl(or ethyl)-1-propanol, 2-amino-1-butanol, 3-amino-1,2-propanediol, 2-amino-2-methyl(ethyl)-1,3-propanediol, and alcohols, for example ethylene glycol, diethylene glycol, 1,4-dihydroxybutane, 1,6-dihydroxyhexane, dimethylolpropane, glycerol and pentaerythritol, and sorbitol and sucrose, or mixtures of these compounds, can additionally be present.

Polyester polyols such as are accessible in a manner known per se by reaction of low molecular weight alcohols with polyfunctional carboxylic acids, such as adipic acid, phthalic acid, hexahydrophthalic acid, tetrahydrophthalic acid or the anhydrides of these acids are furthermore suitable as long as the viscosity of the H-active component does not become too high. A preferred polyol which contains ester groups is castor oil. In addition, formulations with castor oil such as can be obtained by dissolving resins, e.g. aldehyde-ketone resins, and modifications of castor oil and polyols based on other natural oils are also suitable.

Those higher molecular weight polyhydroxy-polyethers in which high molecular weight polyadducts or polycondensates or polymers are present in finely disperse, dissolved or grafted-on form are likewise suitable. Such modified polyhydroxy compounds are obtained in a manner known per se, e.g. when polyaddition reactions (e.g. reactions between polyisocyanates and amino-functional compounds) or polycondensation reactions (e.g. between formaldehyde and phenols and/or amines) are allowed to proceed in situ in the compounds containing hydroxyl groups. However, it is also possible to mix a ready-made aqueous polymer dispersion with a polyhydroxy compound and then to remove the water from the mixture.

Polyhydroxy compounds modified by vinyl polymers, such as are obtained e.g. by polymerization of styrene and acrylonitrile in the presence of polyethers or polycarbonate polyols, are also suitable for the preparation of polyurethanes. If polyether polyols which have been modified in accordance with DE-A 2 442 101, DE-A 2 844 922 and DE-A 2 646 141 by grafting polymerization with vinylphosphonic acid esters and optionally (meth)acrylonitrile, (meth)acrylamide or OH-functional (meth)acrylic acid esters are used, plastics of particular flame resistance are obtained.

Representatives of the compounds mentioned which are to be used as H-active compounds are described e.g. in High Polymers, vol. XVI, "Polyurethanes Chemistry and Technology", Saunders-Frisch (ed.) Interscience Publishers, New York, London, vol. 1, p. 32-42, 44, 54 and vol. II, 1984, p. 5-6 and p. 198-199.

Mixtures of the compounds listed can also be employed.

The limit to the average OH number and average functionality of the H-active component results in particular from the increasing embrittlement of the resulting polyurethane. However, the possibilities of influencing the physical polymer properties of the polyurethane are known in principle to the person skilled in the art, so that the NCO component, aliphatic diol and polyol can be coordinated to one another in a favourable manner.

The polyurethane layer (b) can be foamed or solid, such as e.g. as a lacquer or coating.

All auxiliary substances and additives known per se, such as e.g. release agents, blowing agents, fillers, catalysts and flameproofing agents, can be employed for the production thereof.

In this context, auxiliary substances and additives which are optionally to be used are:

a) Water and/or Readily Volatile Inorganic or Organic Substances as Blowing Agents Possible organic blowing agents are e.g. acetone, ethyl acetate, halogen-substituted alkanes, such as methylene chloride, chloroform, ethylidene chloride, vinylidene chloride, monofluorotrichloromethane, chlorodifluoromethane, dichlorodifluoromethane, furthermore butane, hexane, heptane or diethyl ether, possible inorganic blowing agents are air, $CO_2$ or N20. A blowing action can also be achieved by addition of compounds which decompose at temperatures above room temperature with splitting off of gases, for example nitrogen, e.g. azo compounds, such as azodicarboxamide or azoisobutyric acid nitrile.

b) Catalysts

The catalysts are, for example,
tertiary amines (such as triethylamine, tributylamine, N-methylmorpholine, N-ethylmorpholine, N,N,N',N'-tetramethylethylenediamine, pentamethyldiethylenetriamine and higher homologues, 1,4-diazabicyclo-(2,2,2)octane, N-methyl-N'-dimethylaminoethylpiperazine, bis-(dimethylaminoalkyl) piperazines, N,N-dimethylbenzylamine, N,N-dimethylcyclohexylamine, N,N-diethylbenzylamine, bis-(N,N-diethylaminoethyl)adipate, N,N,N',N'-tetramethyl-1,3-butanediamine, N,N-dimethyl-β-phenylethylamine, 1,2-dimethylimidazole, 2-methylimidazole),
monocyclic and bicyclic amides, bis-(dialkylamino)alkyl ethers,
tertiary amines containing amide groups (preferably formamide groups),
Mannich bases of secondary amines (such as dimethylamine) and aldehydes (preferably formaldehyde or ketones, such as acetone, methyl ethyl ketone or cyclohexanone) and phenols (such as phenol, nonylphenol or bisphenol),
tertiary amines containing hydrogen atoms which are active towards isocyanate groups (e.g. triethanolamine, triisopropanolamine, N-methyldiethanolamine, N-ethyldiethanolamine, N,N-dimethylethanolamine), and reaction products thereof with alkylene oxides, such as propylene oxide and/or ethylene oxide,
secondary-tertiary amines,
silaamines with carbon-silicon bonds (2,2,4-trimethyl-2-silamorpholine and 1,3-diethylaminomethyltetramethyldisiloxane),
nitrogen-containing bases (such as tetraalkylammonium hydroxides),
alkali metal hydroxides (such as sodium hydroxide, alkali metal phenolates, such as sodium phenolate),
alkali metal alcoholates (such as sodium methylate), and/or hexahydrotriazines.

The reaction between NCO groups and Zerewitinoff-active hydrogen atoms is also greatly accelerated in a manner known per se by lactams and azalactams, an associate between the lactam and the compound with acidic hydrogen initially being formed.

Organometallic compounds, in particular organotin and/or -bismuth compounds, can also be used as catalysts. Possible organotin compounds are, in addition to sulfur-containing compounds, such as di-n-octyltin mercaptide, preferably tin (II) salts of carboxylic acids, such as tin(II) acetate, tin(II) octoate, tin(II) ethylhexoate and tin(II) laurate, and the tin (IV) compounds, e.g. dibutyltin oxide, dibutyltin dichloride, dibutyltin diacetate, dibutyltin dilaurate, dibutyltin maleate or dioctyltin diacetate. Organic bismuth catalysts are described, for example, in the patent application WO 2004/000905.

All the abovementioned catalysts can of course be employed as mixtures. In this context, combinations of organometallic compounds and amidines, aminopyridines or hydrazinopyridines are of particular interest.

The catalysts are as a rule employed in an amount of from about 0.001 to 10 wt. %, based on the total amount of compounds with at least two hydrogen atoms which are reactive towards isocyanates.

c) Surface Active Additives, Such as Emulsifiers and Foam Stabilizers.

Possible emulsifiers are e.g. the sodium salts of castor oil sulfonates or salts of fatty acids with amines, such as diethylamine oleate or diethanolamine stearate. Alkali metal or ammonium salts of sulfonic acids, such as, for example, of dodecylbenzenesulfonic acid or dinaphthylmethanedisulfonic acid, or of fatty acids, such as ricinoleic acid, or of polymeric fatty acids can also be co-used as surface-active additives.

Possible foam stabilizers are, above all, polyether-siloxanes, specifically water-soluble representatives. These compounds are in general built up such that a copolymer of ethylene oxide and propylene oxide is bonded to a polydimethylsiloxane radical. Polysiloxane/polyoxyalkylene copolymers branched several times via allophanate groups are of particular interest.

d) Reaction Retardants

Possible reaction retardants are e.g. acid-reacting substances (such as hydrochloric acid or organic acid halides).

e) Additives

Possible PU additives are, for example, cell regulators of the type known per se (such as paraffins or fatty alcohols) or dimethylpolysiloxanes and pigments or dyestuffs and flameproofing agents of the type known per se (e.g. trischloroethyl phosphate, tricresyl phosphate or ammonium phosphate and polyphosphate), furthermore stabilizers against the influences of ageing and weathering, plasticizers and fungistatically and bacteriostatically acting substances as well as fillers (such as barium sulfate, kieselguhr, carbon black or prepared chalk).

Further examples of surface-active additives and foam stabilizers as well as cell regulators, reaction retardants, stabilizers, flame-retardant substances, plasticizers, dyestuffs and fillers and fungistatically and bacteriostatically active substances optionally to be co-used according to the invention are known to the person skilled in the art and described in the literature.

Lacquers to be used according to the invention include 1-C and 2-C lacquer systems, preferably water-based lacquers. A two-component lacquer (2-C) in the context of the invention also contains a hardener in addition to the water-based lacquer according to the invention.

According to one embodiment, the water-based lacquer according to the invention is a one-component lacquer.

In an alternative embodiment, the coating on at least one side is a water-based 2-component polyurethane lacquer.

The coating has at least one lacquer layer (base lacquer) and preferably a protective layer (top lacquer). The base lacquer particularly preferably has two layers.

2-Component polyurethane lacquers to be used according to the invention are characterized in that they preferably essentially contain in one embodiment:
(a) polyisocyanates, which are optionally hydrophilized, optionally in the presence of organic solvents or solvent mixtures,
(b) compounds which have groups which are reactive towards isocyanates and are optionally hydrophilized, in water and optionally in the presence of organic solvents or solvent mixtures,
(c) optionally further additives and auxiliary substances,
wherein the amounts of (a)+(b) are from 20 to 100 parts by wt., the amount of (c) is from 0 to 80 parts by wt., with the proviso that the sum of the parts by weight of the individual components (a) to (c) is 100.

Two-component systems in the context of the present invention are understood as meaning lacquers in which components (a) and (b) must or should be stored in separate vessels because of their reactivity. The two components are mixed only shortly before application and then in general react without additional activation.

The (poly)isocyanate component (a) is any desired organic polyisocyanates which have aliphatically, cycloaliphatically, araliphatically and/or aromatically bonded, free isocyanate groups and are liquid at room temperature or are diluted with solvents for this purpose. The polyisocyanate component (a) advantageously has a viscosity at 23° C. of from 10 to 15,000, preferably 10 to 5,000 mPas. The polyisocyanate component (a) is particularly preferably polyisocyanates or polyisocyanate mixtures with exclusively aliphatically and/or cycloaliphatically bonded isocyanate groups having an (average) NCO functionality of between 2.0 and 5.0 and a viscosity at 23° C. of from 10 to 2,000 mPas.

Preferably, polyisocyanates having free NCO groups are employed as crosslinking agents, in order to obtain a particularly high level of lacquer technology from the water-based two-component polyurethane lacquers. Suitable such crosslinker resins are, for example, polyisocyanates based on isophorone-diisocyanate (IPDI), hexamethylene-diisocyanate (HDI), 1,4-diisocyanatocyclohexane, bis-(4-isocyanatocyclohexyl)-methane, 1,3-diisocyanatobenzene, 2,4- and/or 2,6-diisocyanatotoluene (TDI), diisocyanatodiphenylmethane (MDI) and ω,ω'-diisocyanato-1,3-dimethylcyclohexane (H6XDI). Polyisocyanates based on isophorone-diisocyanate, hexamethylene-diisocyanate, bis-(4-isocyanatocyclohexyl)-methane and ω,ω'-diisocyanato-1,3-dimethylcyclohexane (H6XDI) are preferred.

The diisocyanates mentioned can optionally be used as such, but as a rule derivatives of the diisocyanates are used. Suitable derivatives are polyisocyanates containing biuret, isocyanurate, uretdione, urethane, iminooxadiazinedione, oxadiazinetrione, carbodiimide, acylurea and allophanate groups.

Preferred derivatives are those with isocyanurate, iminooxadiazinedione and uretdione structures. Low-monomer lacquer polyisocyanates with these structural elements from isophorone-diisocyanate (IPDI), hexamethylene-diisocyanate (HDI), 1,4-diisocyanatocyclohexane, bis-(4-isocyanatocyclohexyl)-methane are particularly preferred.

Triisocyanates, such as e.g. TIN (triisocyanatononane) are also suitable.

The (poly)isocyanate component (a) can optionally be hydrophilically modified. Water-soluble or -dispersible polyisocyanates are obtainable e.g. by modification with carboxylate, sulfonate and/or polyethylene oxide groups and/or polyethylene oxide/polypropylene oxide groups.

Hydrophilization of the polyisocyanates is possible e.g. by reaction with deficient amounts of monofunctional, hydrophilic polyether alcohols. The preparation of such hydrophilized polyisocyanates is described, for example, in EP-A 0 540 985, p. 3, l. 55-p. 4, l. 5. The polyisocyanates described in EP-A-0 959 087, p. 3, l. 39-51 which contain allophanate groups and are prepared by reaction of low-monomer polyisocyanates with polyethylene oxide polyether alcohols under allophanation conditions are also particularly suitable. The water-dispersible polyisocyanate mixtures based on triisocyanatononane which are described in DE-A 10 007 821, p. 2, l. 66-p. 3, l. 5, are also suitable, as well as polyisocyanates hydrophilized with ionic groups (sulfonate, phosphonate groups), such as are described e.g. in DE-A 10 024 624, p. 3, l. 13-33 or also in WO 01/88006. External hydrophilization by addition of emulsifiers is likewise possible.

The NCO content of the polyisoyanate component (a) used, e.g. in the case of so-called polyether allophanates (hydrophilization by means of a polyether), can range from 5-25 wt. %. In the case of a hydrophilization with sulfonic acid groups, NCO contents of 4-26 wt. % can be achieved, where these figures are to be understood as being only by way of example.

The isocyanate components employed can also be partially blocked, e.g. by up to one third of the isocyanate groups present, by components which are reactive towards isocyanates. In this case, reaction of the blocked isocyanate component with further polyol can occur in a later step, in order to bring about a further crosslinking.

Suitable blocking agents for these polyisocyanates are, for example, monofunctional alcohols, such as oximes, such as acetoxime, methyl ethyl ketoxime, cyclohexanone oxime, lactams, such as ε-caprolactam, phenols, amines, such as diisopropylamine or dibutylamine, dimethylpyrazole or triazole, and malonic acid dimethyl ester, malonic acid diethyl ester or malonic acid dibutyl ester.

The use of low-viscosity, hydrophobic or hydrophilized polyisocyanates having free isocyanate groups based on aliphatic, cycloaliphatic, araliphatic and/or aromatic isocyanates, particularly preferably aliphatic or cycloaliphatic isocyanates, is preferred, since a particularly high level of properties of the lacquer film can be achieved in this way. The advantages of the binder dispersions according to the invention emerge most clearly in combination with these crosslinking agents. These polyisocyanates in general have a viscosity of from 10 to 3,500 mPas at 23° C. If necessary, the polyisocyanates can be employed in a mixture with small amounts of inert solvents in order to lower the viscosity to a value within the range stated. Triisocyanatononane can also be employed as the crosslinker component alone or in mixtures.

The use of mixture of various polyisocyanates is of course also possible in principle.

Suitable compounds (b) having groups which are reactive towards isocyanates are, for example, polymers, containing hydroxyl groups, sulfonate and/or carboxylate groups, preferably carboxylate groups and optionally sulfonic acid and/or carboxyl groups, preferably carboxyl groups, of olefinically unsaturated monomers (so-called polyacrylate polyols), of combinations of diols and dicarboxylic acids (so-called polyester polyols), of combinations of diols, dicarboxylic acids and diisocyanates (so-called polyurethane polyols) and/or of hybrid systems of the polyol classes mentioned, for example polyacrylate-polyester polyols, polyacrylate-polyurethane polyols, polyester-polyurethane polyols or polyester-polyurethane polyols, which preferably have a molecular weight Mn (number-average), which can be determined by gel permeation chromatography, of from 500 to 50,000, in particular 1,000 to 10,000, a hydroxyl number of from 16.5 to 264, preferably 33 to 165 mg of KOH/g of solid resin, an acid number (based on the non-neutralized sulfonic acid and/or carboxyl groups) of from 0 to 150, preferably 0 to 100 mg of KOH/g of solid resin, and a content of sulfonate and/or carboxyl groups of from 5 to 417, preferably 24 to 278 milliequivalents per 100 g of solid.

These anionic groups are particularly preferably carboxylate groups. An overview of various binders is given e.g. in EP-A 0 959 115, p. 3, l. 26-54. However, simple diol components can also be used. All binders which are dissolved or dispersed in water and have groups which are reactive towards isocyanates are suitable in principle as the binder component (b). These also include, for example, polyurethanes or polyureas which are dispersed in water and can be crosslinked with polyisocyanates due to the active hydrogen atoms present in the urethane or urea groups. However, polyols, that is to say compounds with free OH groups, are preferred.

The binder components (b) are in general employed in the preparation of the coating compositions in the form of 10 to 60, preferably 20 to 50 wt. % strength aqueous solutions and/or dispersions, which in general have a viscosity of from 10 to 105, preferably 100 to 10,000 mPa·s/23° C. and pH values of from 5 to 10, preferably 6 to 9. Auxiliary solvents can optionally be used.

Depending on the molecular weight of the binder component (b) and its content of anionic groups or of free acid groups, in particular carboxyl groups, the aqueous systems containing the polymers are true dispersions, colloidally disperse or molecularly disperse dispersions, but in general so-called "partial dispersions", i.e. aqueous systems which are partly molecularly disperse and partly colloidally disperse.

The ratio of isocyanate groups from component (a) to isocyanate-reactive groups, such as hydroxyl groups (NCO—OH ratio) from component (b) can span a wide range. A ratio of from 0.2:1.0 to 4.0:1.0 can thus be used for lacquer technology uses. A range of from 0.35:1 to 2.0:1.0 is preferred, particularly preferably 1.0:1.0 to 1.5:1.0.

1 to 10,000 ppm of commercially available catalysts can optionally be added to the composition.

The conventional auxiliary substances and additives (d) of lacquer technology, such as e.g. defoaming agents, thickening agents, pigments, dispersing auxiliaries, further catalysts which differ from (c), skin prevention agents, antisettling agents or emulsifiers, can be added before, during or after the preparation of the aqueous binder dispersion according to the invention and also in the case of preparation of the coating compositions by addition of at least one crosslinking agent.

The two-component polyurethane systems according to the invention contain water and optionally organic solvents or mixtures thereof as solvents.

Organic solvents which can be used are all the known solvents. The solvents used in the lacquer industry are preferred, such as xylene, butyl acetate, ethyl acetate, butyl glycol acetate, Butoxyl, methoxypropyl acetate, hydrocarbons, such as Solvesso® 100 (Exxon Mobil Chemicals) (Solvent Naphtha can also be used as an alternative) or N-methylpyrrolidone.

The organic solvents are as a rule employed, if at all, only in the amounts just necessary. Thus, for example, for predilution of the polyisocyanates (a) employed or in just the amount required for preparation of the binder component (b) dissolved or dispersed in water.

Component A

Linear polycarbonate based on bisphenol A having a relative solution viscosity ($\eta_{rel}$) (measured on solutions of 0.5 g of polycarbonate in 100 ml of methylene chloride at 25° C.) of 1.28.

Component B.1

Rubber-free copolymer, prepared in the bulk polymerization process, of 76 wt. % of styrene and 24 wt. % of acrylonitrile having a weight-average molecular weight $M_w$ of 130 kg/mol (determined by GPC with polystyrene as the standard).

Component B.2

ABS polymer prepared by bulk polymerization of 88 wt. %, based on the ABS polymer, of a mixture of 24 wt. % of acrylonitrile and 76 wt. % of styrene in the presence of 12 wt. %, based on the ABS polymer, of a linear polybutadiene rubber. The ABS polymer has a gel content, determined in toluene, of 25 wt. %.

Component C

Graft polymer, prepared in the emulsion polymerization process and having a gel content, determined in toluene, of 95 wt. %, consisting of 28 wt. % of styrene/acrylonitrile copolymer as the shell with a weight ratio of styrene to acrylonitrile of 71:29, on 72 wt. % of a particulate graft base as the core, consisting of 46 wt. % of silicone rubber and 54 wt. % of butyl acrylate rubber.

Component D-1

Polybutylene terephthalates (e.g. Pocan B1300, Lanxess AG, Cologne, Germany) having a viscosity number of 1.07 dl/g, measured in phenol/o-dichlorobenzene (1:1 parts by weight) in a concentration of 0.05 g/ml in accordance with ISO 307 at 25° C. in an Ubbelohde viscometer.

Component D-2

Polyethylene terephthalate (e.g. RT6020, Invista, Gersthofen, Germany) having an intrinsic viscosity of 0.665 dl/g, measured in dichloroacetic acid in a concentration of 1 wt. % at 25° C.

Component E-1

Talc with an average particle diameter $D_{50}$ of 1.2 μm, measured by means of a Sedigraph, and having an $Al_2O_3$ content of 0.5 wt. %.

Component E-2

Wollastonite with an average particle diameter $D_{50}$ of 7 μm and a surface of 2.9 $m^2/g$ measured by Microtrac particle-analysis.

Component E-3

Boron-aluminum glass fiber with an average diameter of 13 μm and a cut length, of 2.5-3.5 mm.

Component F-1

Pentaerythritol tetrastearate as a lubricant/mould release agent

Component F-2

Heat stabilizer Irganox® B900 (mixture of 80% Irgafos® 168 and 20% Irganox® 1076; BASF AG; Ludwigshafen/ Irgafos® 168 (tris(2,4-di-tert-butylphenyl)phosphite)/Irganox® 1076 (2,6-di-tert-butyl-4-(octadecanoxycarbonyl-ethyl)-phenol) (BASF AG, Ludwigshafen, Germany)

Component F-3

Free-flowing mixture of 75 wt. % of concentrated phosphoric acid and 25 wt. % of hydrophilic silica gel.

Component F-4

Carbon Black

Preparation of the Moulding Compositions

The moulding compositions according to the invention containing components A to F are prepared on a ZSK25 twin-screw extruder from Coperion, Werner and Pfleiderer (Germany) at melt temperatures of from 270° C. to 300° C.

Production of the Test Specimens and Testing

The granules resulting from the particular compounding were processed on an injection moulding machine (Arburg) at a melt temperature of 260° C. and a mould temperature of 80° C. to give test specimens.

Coating of the test specimens was carried out, after cleaning of the injection moulded bodies with isopropanol and flame treatment, by application of the lacquer (base lacquer) to the surface with a lacquering gun. The lacquer was then dried at 80° C. for 15 min.

Thereafter, a protective layer (clear lacquer) was applied in the same manner and dried at 80° C. for 30 min.

The layer thickness of the resulting lacquer build-up was 45 μm (base lacquer 15 μm, protective layer 30 μm).

Base Lacquer:

Wörwag standard water-based lacquer "Schwarz" 113161.

Protective Layer:

Wöropur clear lacquer, high-gloss 108728 with Wöropur hardener 60738 (both from Wörwag).

The melt flowability (MVR) is evaluated with the aid of the melt volume flow rate (MVR) measured in accordance with ISO 1133 at a temperature of 260° C. and with a plunger load of 5 kg.

The heat distortion temperature was measured in accordance with DIN ISO 306 (Vicat softening temperature, method B with a 50 N load and a heating rate of 120 K/h) on a test bar of dimensions 80×10×4 mm injection moulded on one side.

The melt viscosity was determined in accordance with ISO 11443 at a temperature of 260° C. and a shear rate of 1,000 s-1.

The determination of the notched impact strength (ak) and the impact strength (an) is carried out in accordance with ISO 180/1A and, respectively, ISO 180/1U at room temperature (23° C.) by a 10-fold determination on test bars of dimensions 80 mm×10 mm×4 mm.

The elongation at break and the tensile E modulus is determined at room temperature (23° C.) in accordance with ISO 527-1, -2 on shoulder bars of dimensions 170 mm×10 mm×4 mm.

The resistance to stress cracking under the influence of media (environmental stress cracking=ESC) is determined at room temperature (23° C.) in accordance with ISO 4599 on test bars of dimensions 80 mm×10 mm×4 mm. In this context, the time to fracture failure of the test specimens, which were loaded with an external edge fibre elongation of 2.4% by means of a clamping template and immersed completely in rape oil as the medium, serves as a measure of the resistance to stress cracking.

The coefficient of linear thermal expansion (CLTE) is determined in accordance with DIN 53752 in the temperature interval of from −20° C. to 80° C. on a test specimen of dimensions 60 mm×60 mm×2 mm, in each case parallel and perpendicular to the melt flow direction during production of the test specimens.

The lacquer adhesion is determined with the cross-hatch test in accordance with DIN ISO 2409 and with resistance testing against a pressurized water jet (steam jet test) in accordance with DIN 55662 8.1/8.2.

The shaped parts according to the invention preferably have a rating for adhesion of the lacquer to the base according to the cross-hatch test of less than or equal to 1, preferably equal to 0, and a rating of the adhesion according to the steam jet test equal to 0.

The following examples serve to explain the invention further.

TABLE 1

|  | C1 | 2 | 3 | 4 | 5 | 6 | 7 |
|---|---|---|---|---|---|---|---|
| Compositions |  |  |  |  |  |  |  |
| A | 49 | 49 | 49 | 49 | 49 | 49 | 49 |
| B.1 | 16 | 14 | 12 | 10 | 8 | 4 | 0 |
| B.2 | 8 | 8 | 8 | 8 | 8 | 8 | 8 |
| C | 6 | 6 | 6 | 6 | 6 | 6 | 6 |
| D-1 | 0 | 2 | 4 | 6 | 8 | 12 | 16 |
| E-1 | 20 | 20 | 20 | 20 | 20 | 20 | 20 |
| F-1 | 0.7 | 0.7 | 0.7 | 0.7 | 0.7 | 0.7 | 0.7 |
| F-2 | 0.1 | 0.1 | 0.1 | 0.1 | 0.1 | 0.1 | 0.1 |
| F-3 | 0.2 | 0.2 | 0.2 | 0.2 | 0.2 | 0.2 | 0.2 |
| F-4 | 0.6 | 0.6 | 0.6 | 0.6 | 0.6 | 0.6 | 0.6 |
| Calculated auxiliary parameters |  |  |  |  |  |  |  |
| B (total) | 24.00 | 22.00 | 20.00 | 18.00 | 16.00 | 12.00 | 8.00 |
| D/(A + D) | 0.0% | 3.9% | 7.5% | 10.9% | 14.0% | 19.7% | 24.6% |
| Y | — | 10.4 | 4.7 | 2.8 | 1.9 | 0.9 | 0.4 |
| Properties |  |  |  |  |  |  |  |
| MVR [ml/10 min] | 12.7 | 15.6 | 12.9 | 12.63 | 12.35 | 14.7 | 14.8 |
| Melt viscosity [Pas] | 225 | 339 | 245 | 254 | 262 | 291 | 306 |
| Vicat B120 [° C.] | 130.7 | 123.1 | 127.1 | 125.1 | 124.3 | 122.7 | 123.4 |
| IZOD notched impact strength [kJ/m$^2$] ($a_k$) | 12.3 | 6.1 | 9.9 | 9.6 | 9.4 | 6.6 | 6.8 |
| IZOD impact strength [kJ/m$^2$] ($a_n$) | 68.3 | 43.5 | 76.5 | 79.5 | 78.5 | 51.9 | 53 |
| Tensile E modulus [MPa] | 4991 | 4990 | 4926 | 4865 | 4828 | 4834 | 4725 |
| Elongation at break [%] | 9.27 | 6.98 | 9.21 | 11.37 | 9.94 | 8.94 | 8.82 |
| ESC (time to fracture) [h] | 02:50 | 02:20 | 02:40 | 03:00 | 03:00 | 03:30 | 07:00 |
| CLTE (parallel) [ppm/K] | 41 | 41 | 41 | 41 | 43 | 42 | 44 |
| CLTE (perpendicular) [ppm/K] | 41 | 41 | 42 | 42 | 42 | 42 | 44 |
| Rating. lacquer adhesion (cross-hatch test) | 5 | 0 | 0 | 0 | 0 | 0 | 0 |
| Rating lacquer adhesion (steam jet test) | 12.7 | 15.6 | 12.9 | 12.63 | 12.35 | 14.7 | 14.8 |

TABLE 2

|  | 8 | 9 | 10 | 11 | 12 | 13 |
|---|---|---|---|---|---|---|
| Compositions |  |  |  |  |  |  |
| A | 55.9 | 43.63 | 49 | 64.08 | 49 | 49 |
| B.1 | 2.3 | 16 | 10 | 13.08 | 10 | 10 |
| B.2 | 8 | 8 | 8 | 8 | 8 | 8 |
| C | 6 | 6 | 6 | 6 | 6 | 6 |
| D-1 | 6.8 | 5.34 |  | 7.85 | 6 | 6 |

TABLE 2-continued

|  | 8 | 9 | 10 | 11 | 12 | 13 |
|---|---|---|---|---|---|---|
| D-2 |  |  | 6 |  |  |  |
| E-1 | 20 | 20 | 20 |  |  |  |
| E-2 |  |  |  |  |  | 20 |
| E-4 |  |  |  |  | 20 |  |
| F-1 | 0.7 | 0.7 | 0.7 | 0.7 | 0.7 | 0.7 |
| F-2 | 0.1 | 0.1 | 0.1 | 0.1 | 0.1 | 0.1 |
| F-3 | 0.2 | 0.2 | 0.2 | 0.2 | 0.2 | 0.2 |
| F-4 | 0.6 | 0.6 | 0.6 | 0.6 | 0.6 | 0.6 |
| Calculated auxiliary parameters |  |  |  |  |  |  |
| B (total) | 10.28 | 24.00 | 18.00 | 21.08 | 18.00 | 18.00 |
| D/(A + D) | 10.9% | 10.9% | 10.9% | 10.9% | 10.9% | 10.9% |
| Y | 1.3 | 4.3 | 2.8 | 2.5 | 2.8 | 2.8 |
| Properties |  |  |  |  |  |  |
| MVR [ml/10 min] | 11.4 | 15.2 | 8.7 | 28.7 | 11.9 | 16.1 |
| Melt viscosity [Pas] | 335 | 227 | 285 | 204 | 240 | 251 |
| Vicat B120 [° C.] | 126.8 | 121.1 | 132.3 | 116.6 | 122.4 | 119.6 |
| IZOD notched impact strength [kJ/m$^2$] ($a_k$) | 8.5 | 6.4 | 5.3 | 35 | 8.4 | 7.2 |
| IZOD impact strength [kJ/m$^2$] ($a_n$) | 62.5 | 39.4 | 35.4 | no break | 26.8 | 99.8 |
| Tensile E modulus [MPa] | 4685 | 4936 | 4779 | 2439 | 6260 | 3893 |
| Elongation at break [%] | 9.64 | 6.79 | 4.69 | 107.3 | 2.14 | 17.34 |
| ESC (time to fracture) [h] | 04:30 | 02:50 | 02:15 | 02:15 | 02:15 | 15:00 |
| CLTE (parallel) [ppm/K] | 41 | 41 | 40 | 70 | 37 | 50 |
| CLTE (perpendicular) [ppm/K] | 43 | 42 | 42 | 73 | 49 | 55 |
| Rating. lacquer adhesion (cross-hatch test) | 0 | 1 | 0 | 0 | 0 | 0 |
| Rating lacquer adhesion (steam jet test) | 1 | 0 | 2 | 1 | 0 | 0 |

The invention claimed is:

1. A polymer composition comprising:
   A) 40 to 62 parts by wt. of at least one polymer selected from the group consisting of aromatic polycarbonates and aromatic polyester carbonates;
   B) 14 to 20 parts by wt. of at least one rubber-free and/or rubber-modified vinyl (co)polymer, said rubber-modified vinyl (co)polymers being prepared by one or more of a bulk, solution or suspension polymerization process;
   C) 4 to 10 parts by wt. of at least one rubber-modified vinyl (co)polymer prepared by an emulsion polymerization process;
   D) 4 to 8 parts by wt. of polybutylene terephthalate;
   E) 15 to 25 parts by wt. of talc; and
   F) 0.3 to 5.0 parts by wt. of at least one polymer additive, wherein sum of parts by weight of components A+B+C+D+E+F in the composition is 100.

2. The composition according to claim 1, wherein a graft base of component C) is a silicone/acrylate composite rubber.

3. The composition according to claim 1, wherein a mixture of a rubber-free vinyl (co)polymer B.1 and a rubber-containing vinyl (co)polymer B.2 is employed as component B.

4. The composition according to claim 1, wherein said composition comprises component D in a concentration of from 6 to 20 wt. %, based on the sum of components A and D.

5. A shaped part produced from a composition according to claim 1, wherein at least one side of the shaped part is coated with a polyurethane system selected from the group consisting of PU lacquer, PU foam and PU skin, wherein the polyurethane system is in direct contact with a base and the polyurethane layer thickness is from 1 μm up to 20 cm.

6. A shaped part according to claim 5, wherein said polyurethane system in direct contact with a base is a PU lacquer having a layer thickness of 5-100 μm.

7. A shaped part according to claim 5, wherein said polyurethane system in direct contact with a base is a 1-component polyurethane lacquer.

8. The shaped part according to claim 5, wherein said polyurethane system in direct contact with a base is a 2-component polyurethane lacquer comprising:
   (a) polyisocyanate;
   (b) compound having a group which is reactive toward isocyanates; and
   (c) optionally one or more further additives and/or auxiliary substances;
   wherein the amounts of (a)+(b) are from 20 to 100 parts by wt., the amount of (c) is from 0 to 80 parts by wt., with the proviso that the sum of parts by weight of individual components (a) to (c) is 100.

9. The shaped part according to claim 5, wherein said shaped part has a polyurethane lacquer layer in direct contact with a base that comprises a base lacquer and at least one protective layer that comprises a top lacquer.

10. The shaped part according to claim 5, wherein rating for adhesion of lacquer to the base according to cross-hatch test is less than or equal to 1 and rating for adhesion according to steam jet test is equal to 0.

11. The composition according to claim 1, which is capable of being used for producing a composite component which is coated with a polyurethane system without a primer and have improved adhesion of a polyurethane system to a base.

12. A shaped part according to claim 6, wherein said polyurethane system in direct contact with a base is a 1-component polyurethane lacquer.

13. The shaped part according to claim 6, wherein said polyurethane system in direct contact with a base is a 2-component polyurethane lacquer comprising:
   (d) a polyisocyanate;
   (e) a compound having a group which is reactive towards isocyanates; and
   (f) optionally one or more further additives and/or auxiliary substances;
   wherein the amounts of (a)+(b) are from 20 to 100 parts by wt., the amount of (c) is from 0 to 80 parts by wt., with the proviso that the sum of the parts by weight of the individual components (a) to (c) is 100.

14. The shaped part of claim 5, having a rating for adhesion of lacquer to base according to cross-hatch test of 0, and a rating of the adhesion according to steam jet test equal to 0.

15. The composition according to claim 3, wherein B.2 comprises 5 to 30 parts by wt of a rubber-elastic graft base.

16. The composition according to claim 3, wherein B.2 has a gel content of from 15 to 40 wt. %.

17. The composition according to claim 3, wherein B.1 comprises a copolymer of styrene and acrylonitrile and B.2 comprises an ABS polymer.

18. The composition according to claim 1, wherein B comprises 14 to 20 parts by wt. of at least one rubber-free and rubber-modified vinyl (co)polymer, said rubber-modified vinyl (co)polymers being prepared by one or more of a bulk, solution or suspension polymerization process.

19. The composition according to claim 18, wherein a weight ratio y of free vinyl (co)polymer from components B and C to aromatic polyester according to component D is in a range of 0.5 to 6.

20. The composition according to claim 18, wherein said composition comprises component D in a concentration of from 8 to 16 wt. %, based on the sum of components A and D.

21. The composition according to claim 20, wherein a weight ratio y of free vinyl (co)polymer from components B and C to aromatic polyester according to component D is in a range of 1 to 5.

\* \* \* \* \*